(No Model.)
G. H. HITCHCOCK.
STUFFING BOX.
No. 501,344.　　　　　　　Patented July 11, 1893.
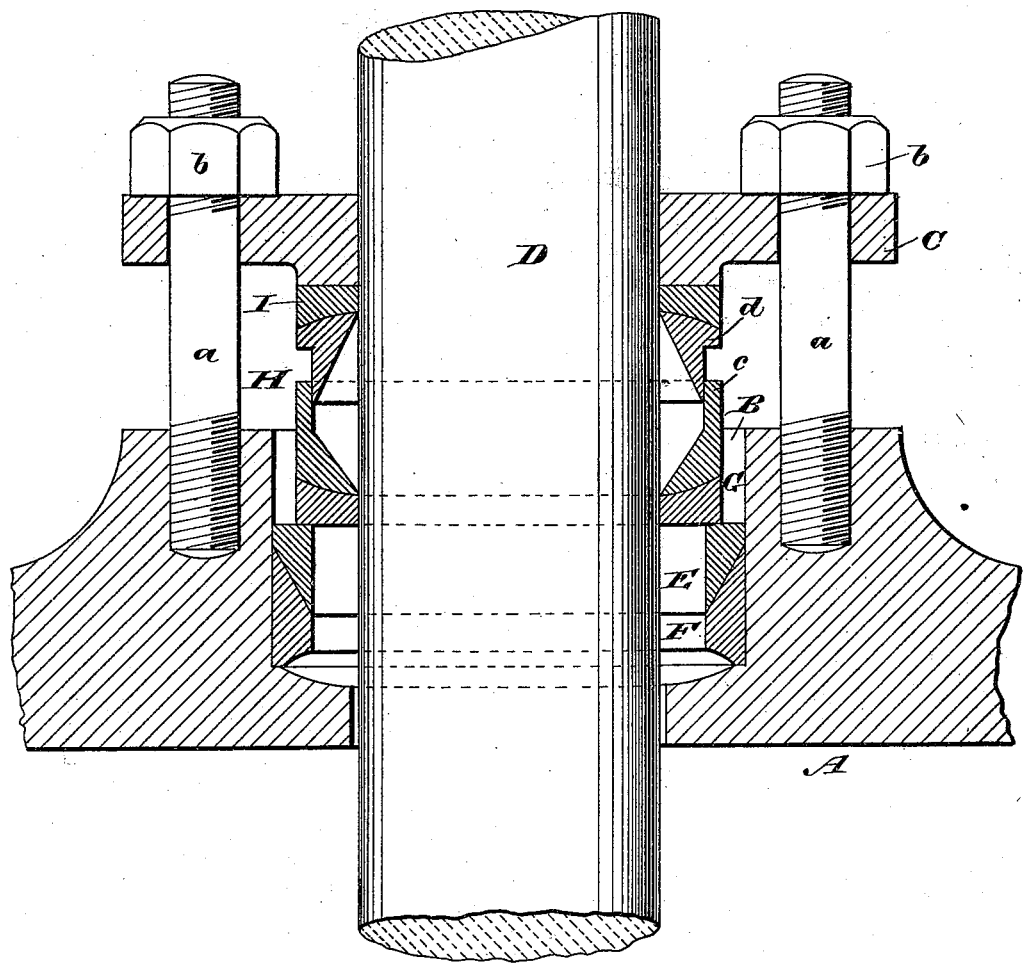
WITNESSES:
H. Walker
E. M. Clark
INVENTOR
G. H. Hitchcock
BY Munn & Co
ATTORNEYS.

UNITED STATES PATENT OFFICE.

GEORGE H. HITCHCOCK, OF DANVILLE, ILLINOIS.

STUFFING-BOX.

SPECIFICATION forming part of Letters Patent No. 501,344, dated July 11, 1893.

Application filed September 3, 1892. Serial No. 444,952. (No model.)

*To all whom it may concern:*

Be it known that I, GEORGE H. HITCHCOCK, of Danville, in the county of Vermilion and State of Illinois, have invented a new and Improved Stuffing-Box, of which the following is a full, clear, and exact description.

Reference is to be had to the accompanying drawing forming a part of this specification, in which the figure is a transverse section.

The object of my invention is to construct a steam tight joint between an adjustable stuffing box and the cylinder head, by means of steam pressure.

My invention consists in the combination with the stuffing box, of an expansion ring, and an expander ring, arranged to expand the expansion ring when acted upon by steam pressure, thus forming a steam tight joint between the adjustable stuffing box and the ordinary stuffing box formed on or attached to the cylinder head.

The cylinder head A is of the usual construction, provided with the counter-bored central aperture B designed for receiving the ordinary gland. The cylinder head is also furnished with studs $a$ having nuts $b$, a follower C being fitted to the studs $a$ and provided with a central aperture for receiving the piston rod D.

In the counter-bored central aperture B are fitted the rings E, F, the ring F being made of soft metal and beveled on its lower inner surface thus forming a space between it and the piston-rod and also between it and the bottom flange of the counter-bored aperture so that the said ring may press the ring forward against the ring E, thus forming a steam tight joint between the two rings and between the ring E and my improved adjustable stuffing box H.

It will be seen that the upper edge of the ring F is beveled or flared outwardly to receive the conical ring E. The said rings E, F, are made expansible so that the outward pressure of steam will cause them to fit the aperture B steam tight.

The adjustable stuffing box H, for which Letters Patent No. 442,047 for an adjustable stuffing box, were granted to me December 2, 1890, consists of a flat ring G resting on the ring E and having a spherically concave upper surface to which is fitted the lower half $c$ of the stuffing box, the said stuffing box having a beveled or countersunk bottom which serves as a seat for the packing contained thereby. The gland $d$ of the stuffing box H is fitted to the part $c$ and beveled or countersunk so that it will tend to force the packing contained in the stuffing box against the piston rod D. The upper surface of the gland $d$ is made spherically convex and to this spherically convex surface of the gland is fitted a flat ring I, the said ring I being kept in contact with the gland $d$ by the follower C.

Having thus fully described my invention, I claim as new and desire to secure by Letters Patent—

1. The combination with the cylinder head provided with a piston rod aperture of greater diameter than the rod and having a counter bore B, of the two expansible rings F E in the base of the counter bore and of greater internal diameter than the piston rod and having beveled engaging surfaces, the lower edge of the ring F being exposed to the steam within the chamber formed by said rings, the stuffing box secured to the cylinder head with its lower end closing the upper end of the steam space formed by the rings E F, and means for securing the stuffing box in place substantially as set forth.

2. The combination with the cylinder head provided with a piston rod aperture of greater diameter than the rod and having a counter bore B, the beveled expansion rings E F, in the lower end of the counter bore and of greater internal diameter than the piston rod thereby forming a steam space to receive steam through piston rod opening, the flat ring G resting on the ring E and closing said steam space the annular telescopic stuffing box sections $c\,d$ recessed on their inner walls and forming a packing space, the flat ring I, and the follower C mounted on the bolts or studs $a$, substantially as set forth.

GEORGE H. HITCHCOCK.

Witnesses:
Mrs. GEORGE HITCHCOCK,
MYRTIE HITCHCOCK.